(12) United States Patent
Ambrosino et al.

(10) Patent No.: US 11,761,554 B2
(45) Date of Patent: Sep. 19, 2023

(54) MOTOR-DRIVEN THROTTLE VALVE FOR AN EXHAUST DUCT

(71) Applicant: MARELLI EUROPE S.P.A., Corbetta (IT)

(72) Inventors: Massimo Ambrosino, Ivrea (IT); Luigi Lubrano, Novara (IT); Emanuele Milani, Sandigliano (IT); Marco Lasana, Turin (IT); Riccardo Rosa, Milan (IT)

(73) Assignee: MARELLI EUROPE S.P.A., Corbetta (IT)

( * ) Notice: Subject to any disclaimer, the term of this patent is extended or adjusted under 35 U.S.C. 154(b) by 0 days.

(21) Appl. No.: 17/684,074

(22) Filed: Mar. 1, 2022

(65) Prior Publication Data

US 2022/0275877 A1 Sep. 1, 2022

(30) Foreign Application Priority Data

Mar. 1, 2021 (IT) .......................... 102021000004703

(51) Int. Cl.
*F16K 31/04* (2006.01)
*F02D 9/04* (2006.01)
(Continued)

(52) U.S. Cl.
CPC .............. *F16K 31/043* (2013.01); *F02D 9/04* (2013.01); *F02D 9/106* (2013.01); *F02D 9/1065* (2013.01);
(Continued)

(58) Field of Classification Search
CPC ........ F16K 31/043; F16K 1/221; F16K 1/224; F16K 1/2268; F16K 27/0218;
(Continued)

(56) References Cited

U.S. PATENT DOCUMENTS 3,693,935 A * 9/1972 Thauer ...................... F02D 9/04
251/305
7,207,545 B2 * 4/2007 Kawai ................... F02D 9/1065
251/305
(Continued)

FOREIGN PATENT DOCUMENTS

DE 3707904 A1 9/1988
DE 202008005992 U1 8/2008
(Continued)

OTHER PUBLICATIONS

Search Report for Italian Patent Application No. 202100004703 dated Nov. 22, 2021.

*Primary Examiner* — John Bastianelli
(74) *Attorney, Agent, or Firm* — Howard & Howard Attorneys PLLC

(57) ABSTRACT

A motor-driven throttle valve for an exhaust duct and having: a tubular duct, which is designed so that exhaust gases can flow through it; a throttle shutter, which is arranged inside the tubular duct and is mounted so as to rotate around a rotation axis; a first shaft, which is mounted so as to rotate around the rotation axis and supports the throttle shutter; an electric actuator, which is provided with a second shaft and is designed to rotate the shaft around the rotation axis; a support bearing, which supports the shaft in a through manner and is arranged on the outside of the tubular duct; and a spring, which applies to the shaft an elastic force, which axially pushes the shaft and, at the same time, is configured to transmit a rotary motion around the rotation axis from the second shaft of the electric actuator to the first shaft supporting the throttle shutter.

24 Claims, 15 Drawing Sheets

(51) Int. Cl.
*F16K 1/22* (2006.01)
*F16K 41/04* (2006.01)
*F16K 27/02* (2006.01)
*F16K 1/226* (2006.01)
*F02D 9/10* (2006.01)

(52) U.S. Cl.
CPC .............. *F16K 1/221* (2013.01); *F16K 1/224* (2013.01); *F16K 1/2268* (2013.01); *F16K 27/0218* (2013.01); *F16K 31/041* (2013.01); *F16K 31/047* (2013.01); *F16K 41/046* (2013.01); *F01N 2240/36* (2013.01)

(58) Field of Classification Search
CPC .... F16K 31/041; F16K 31/047; F16K 41/046; F02D 9/04; F02D 9/106; F02D 9/1065; F01N 2240/36
USPC .................. 251/129.11–129.13, 305–308
See application file for complete search history.

(56) References Cited

U.S. PATENT DOCUMENTS

| | | | |
|---|---|---|---|
| 2003/0030022 A1* | 2/2003 | Michels | F02D 9/104 |
| | | | 251/305 |
| 2003/0178004 A1* | 9/2003 | Keefover | F02D 9/107 |
| | | | 251/305 |
| 2011/0297862 A1* | 12/2011 | Womann | F02D 9/04 |
| | | | 251/305 |
| 2020/0003333 A1 | 1/2020 | Delplanque et al. | |

FOREIGN PATENT DOCUMENTS

| | | | |
|---|---|---|---|
| DE | 102011107088 A1 * | 1/2013 | |
| DE | 102014017523 A1 * | 6/2015 | |
| DE | 102018114360 A1 | 12/2019 | |

* cited by examiner

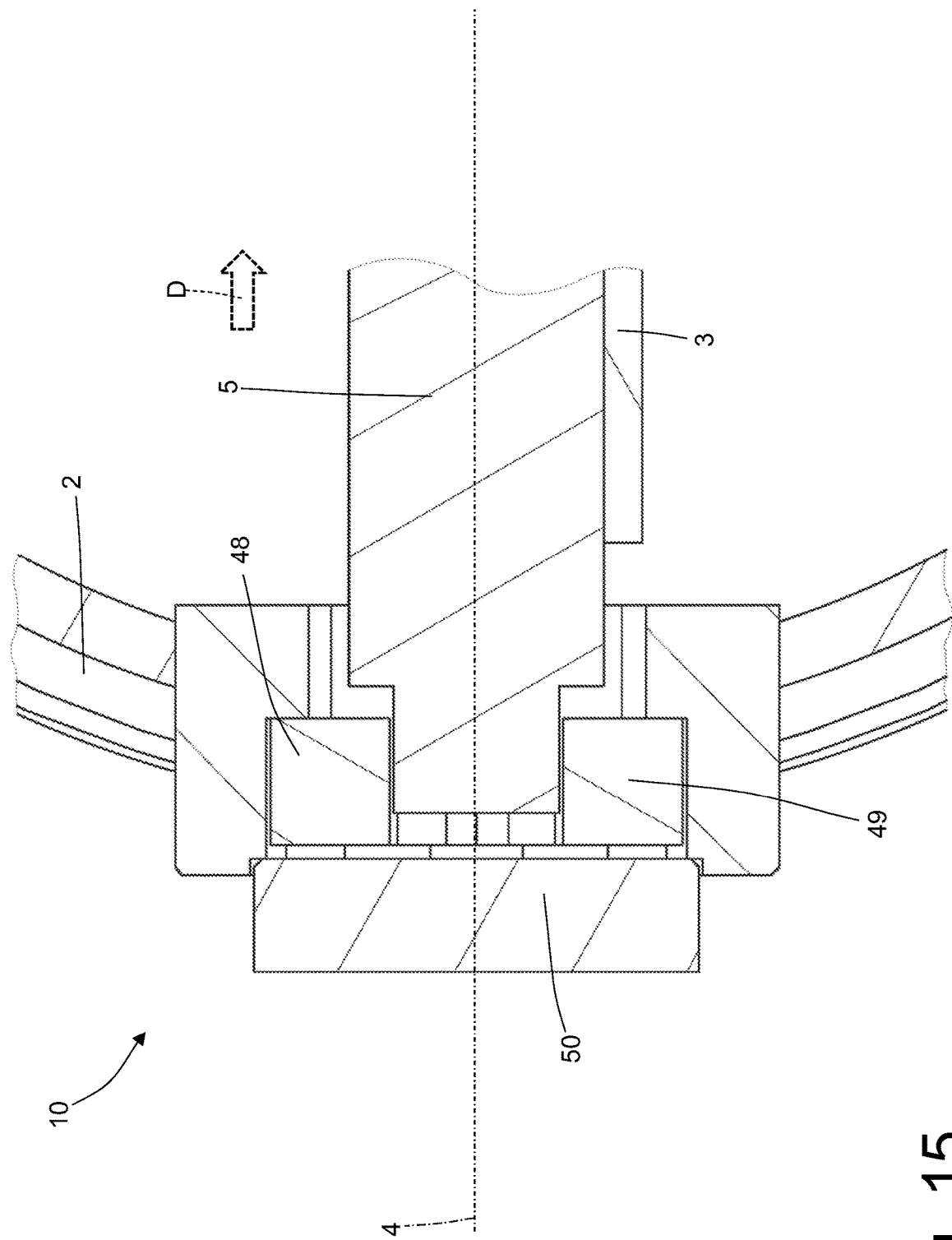

MOTOR-DRIVEN THROTTLE VALVE FOR AN EXHAUST DUCT

CROSS-REFERENCE TO RELATED APPLICATIONS

This patent application claims priority from Italian patent application no. 102021000004703 filed on Mar. 1, 2021, the entire disclosure of which is incorporated herein by reference.

TECHNICAL FIELD

The invention relates to a motor-driven throttle valve for an exhaust duct (namely, suited to be inserted along an exhaust duct to adjust the flow rate of the exhaust gases flowing along the exhaust duct).

BACKGROUND ART

An exhaust system of an internal combustion engine can comprise (at least) a motor-driven throttle valve, which is controlled so as to change (typically, depending on the engine point) the path followed by the exhaust gases. In an exhaust system, a motor-driven throttle valve can be mounted, for example, in an EGR circuit in order to adjust the flow rate of the recirculated exhaust gases or it can be mounted in the area of the silencer in order to have a greater silencing and, hence, a greater back pressure in the presence of a small load and in order to have a smaller silencing and, hence, a smaller back pressure in the presence of a high load.

A motor-driven throttle valve comprises a tubular duct, which is designed to allow exhaust gases to flow through, a throttle shutter, which is arranged inside the tubular duct and is mounted in a rotary manner around a rotation axis so as to rotate between a maximum closing position and a maximum opening position, a shaft, which is mounted in a rotary manner around the rotation axis and support the throttle shutter, and an electric actuator, which is designed to rotate the shaft around the rotation axis.

The shaft is normally mounted in a rotary manner by means of two support bearings, which are arranged in the area of two opposite ends of the tubular duct, and at least one of the two support bearings is arranged in the area of a through opening of the tubular duct, through which a side of the shaft projects from the tubular duct in order to receive the motion from the electric actuator (namely, in order to be connected to the electric actuator).

A significant technological challenge for a motor-driven throttle valve for an exhaust duct lies in the thermal screening of the electric actuator, as an electric actuator cannot stand temperatures exceeding 75-90° C., whereas the exhaust gases flowing through the tubular duct can reach temperatures of more than 600-700° C. (in case of installation of the throttle valve in an EGR circuit).

Another significant technological challenge for a motor-driven throttle valve lies in the sealing of the through opening of the tubular duct, through which the shaft projects out of the tubular duct in order to be connected to the electric actuator, so as to avoid undesired exhaust gas leaks through the throttle valve and towards the outside; indeed, it is evident that rubber gaskets or the like cannot be used due the high temperatures of the exhaust gases flowing through the tubular duct and that it is necessary to take into account the thermal expansion of the metal parts caused by the great temperature differences (in the range of hundreds of Celsius degrees) that occur between the cold engine condition and the hot engine condition.

Patent applications DE102018114360A1 and DE3707904A1 and utility model DE202008005992U1 describe respective examples of a motor-driven throttle valve for an exhaust duct.

DESCRIPTION OF THE INVENTION

The object of the invention is to provide a motor-driven throttle valve for an exhaust duct, which is capable of preserving the integrity of the electric actuator, does not suffer from significant exhaust gas leaks towards the outside and, at the same time, is easy and economic to be manufactured.

According to the invention, there is provided a motor-driven throttle valve for an exhaust duct as claimed in the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein:

FIGS. 14 and 15 are two views, on a larger scale, of respective details of FIG. 13.

PREFERRED EMBODIMENTS OF THE INVENTION

Figure 1:
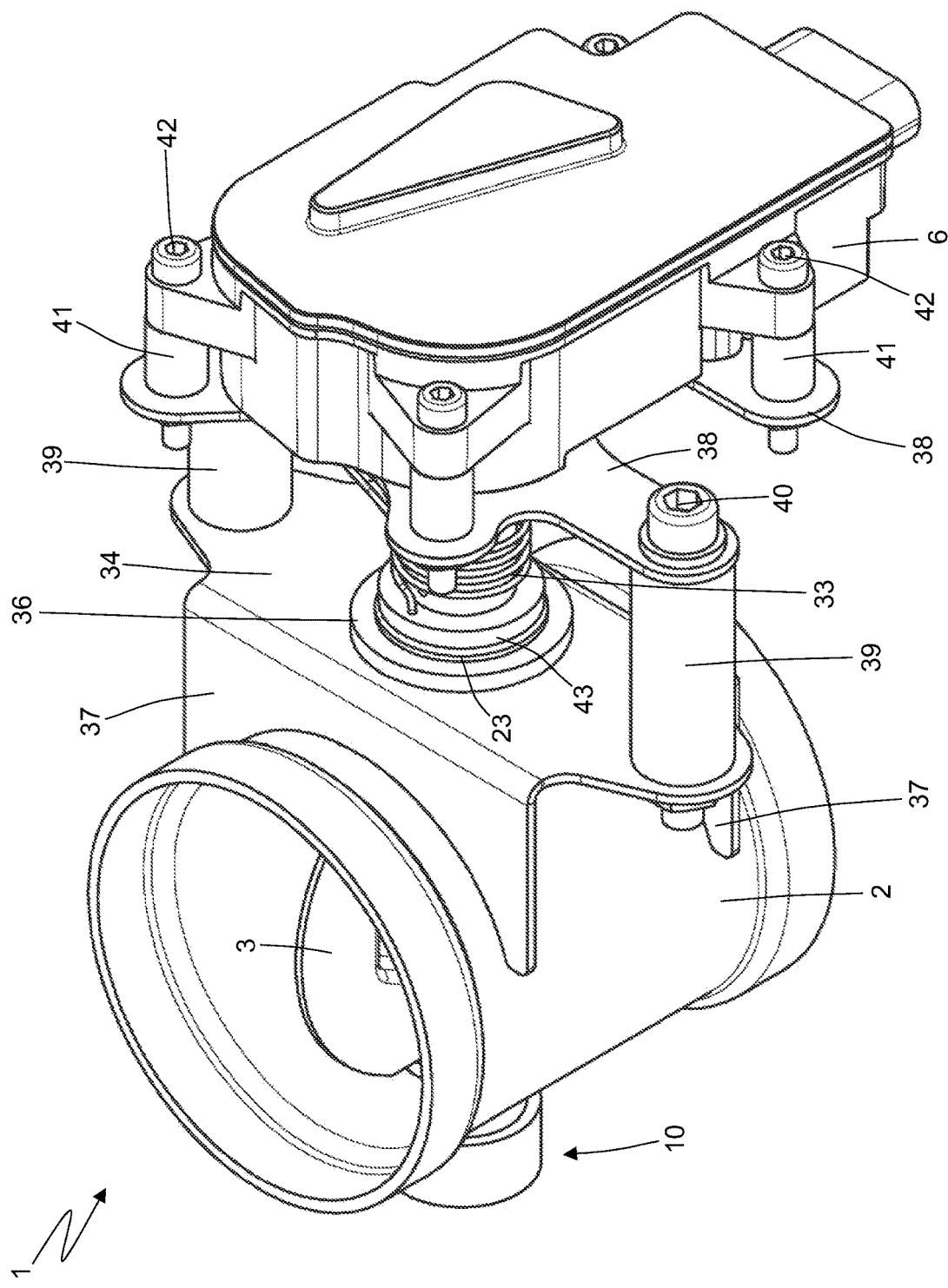
FIG. 1 is a perspective view of a motor-driven throttle valve for an exhaust duct according to the invention.

In FIG. 1, number 1 indicates, as a whole, a motor-driven throttle valve for an exhaust duct (namely, suited to be inserted along an exhaust duct to adjust the flow rate of the exhaust gases flowing along the exhaust duct).

The throttle valve 1 comprises a tubular duct 2, which is designed so that exhaust gases can flow through it, and a throttle shutter 3, which is arranged inside the tubular duct 2 and is mounted in a rotary manner around a rotation axis 4 (shown, for example, in FIG. 2) so as to rotate between a maximum closing position and a maximum opening position. Furthermore, the throttle valve 1 comprises a shaft 5 (shown, for example, in FIG. 2), which is mounted so as to rotate around the rotation axis 4 and supports the throttle shutter 3, and an electric actuator 6, which is designed to rotate the shaft 5 around the rotation axis 4.

Figure 4:
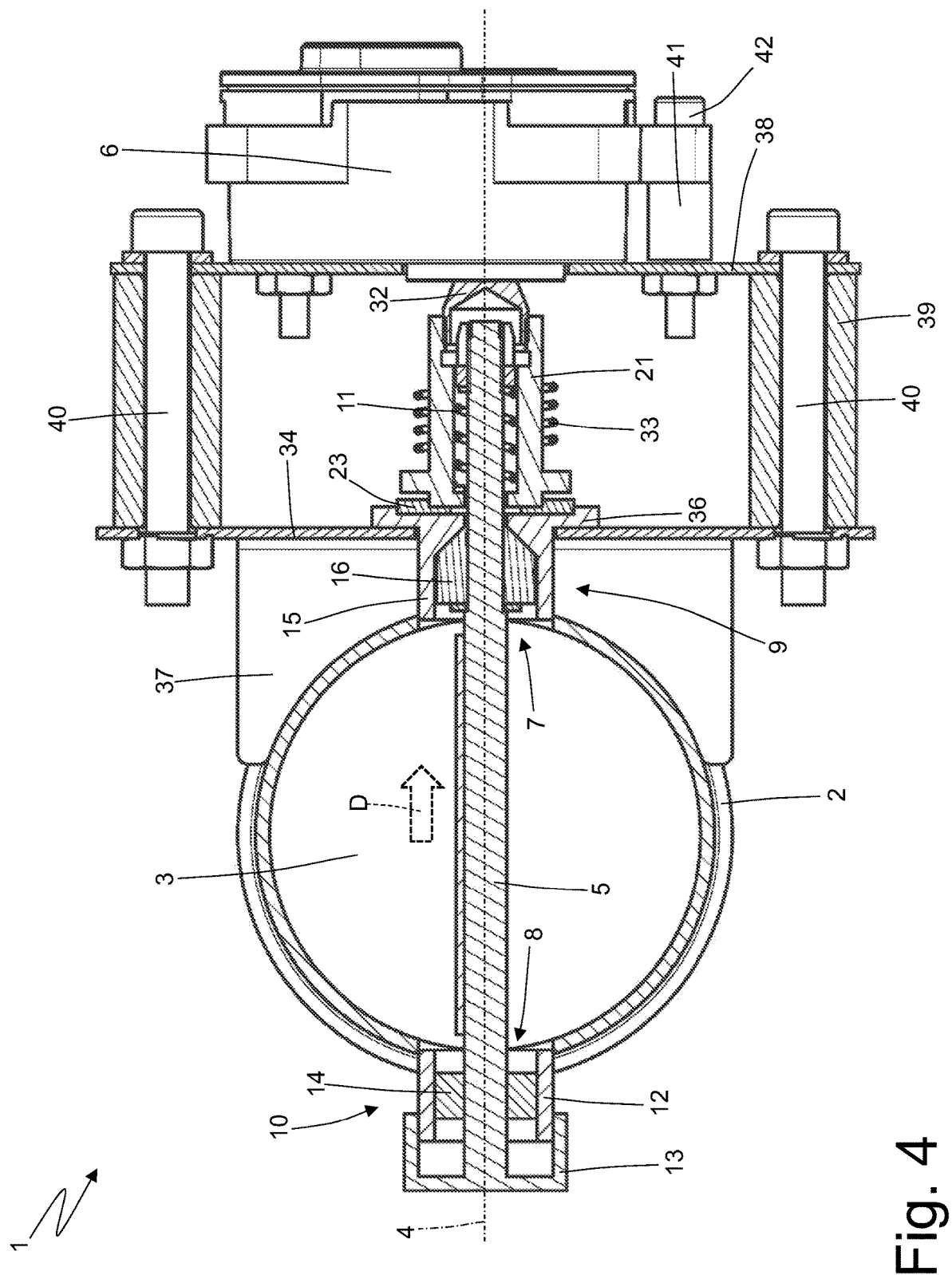
FIGS. 4 and 5 are two different cross-section views of the throttle valve of FIG. 1.
Figure 5:
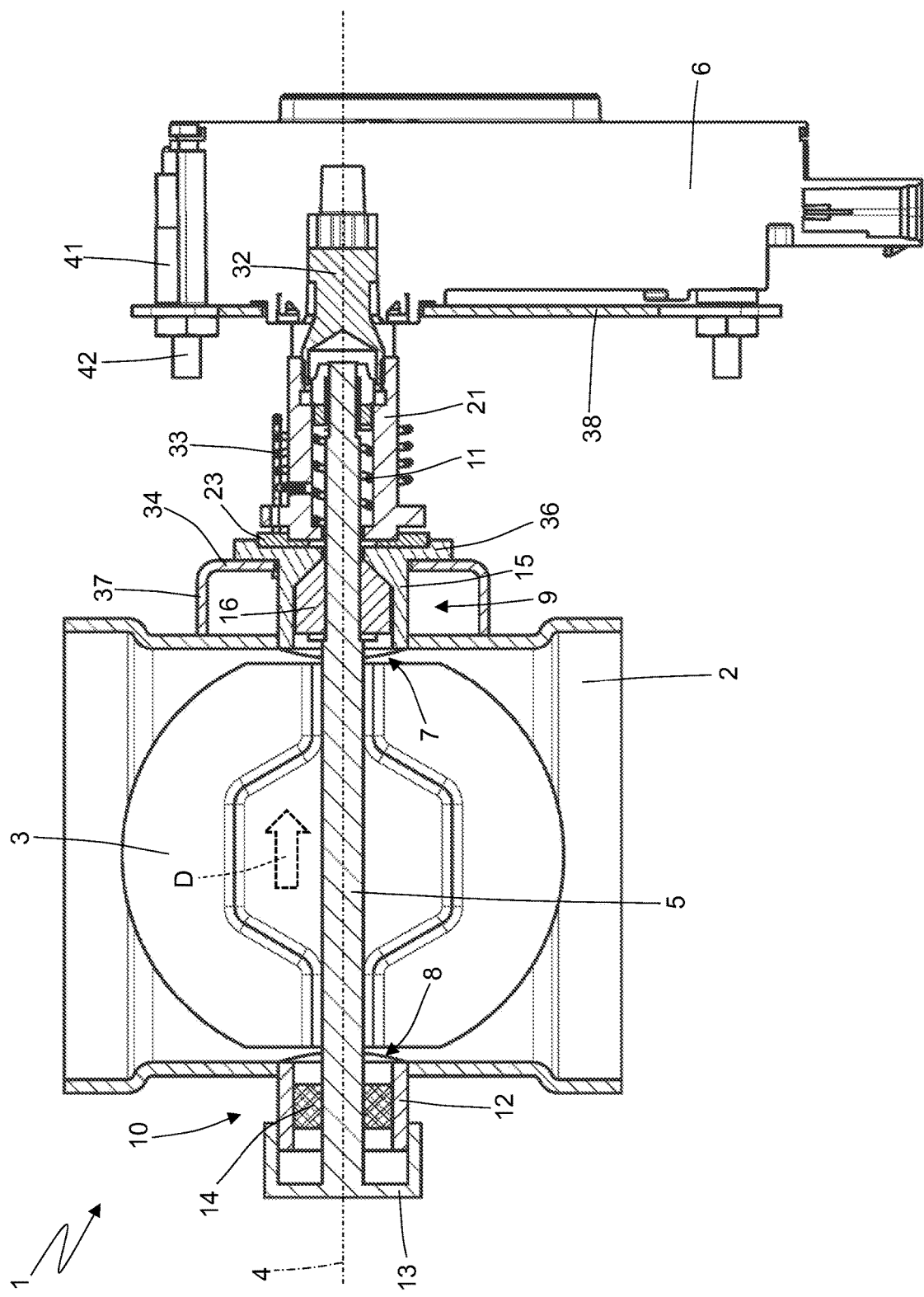

According to FIGS. 4 and 5, the shaft 5 projects out of the tubular duct 2 on both sides through two corresponding through openings 7 and 8 opposite one another, which have a circular shape and are coaxial to the rotation axis 4; in particular, each through opening 7 or 8 has a diameter that is significantly larger than the diameter of the shaft 5. The throttle valve 1 comprises a support bearing 9, which supports the shaft 5 in a through manner (namely, the shaft 5 goes through the support bearing 9 from side to side extending past the support bearing 9) and is arranged on the outside of the tubular duct 2 and on a side of the tubular duct 2 in the area of the through opening 7. Furthermore, the throttle valve 1 comprises a support bearing 10, which supports the shaft 5 at the end (namely, the shaft 5 ends in the area of the support bearing 10) and is arranged on the outside of the tubular duct 2 on a side of the tubular duct 2 that is opposite relative to the support bearing 9 in the area of the through opening 8.

According to FIGS. 4 and 5, the throttle valve 1 comprises a spring 11, which applies an elastic force to the shaft 5, which axially pushes the shaft 5 along a pushing direction D oriented so as to project out of the tubular duct 2 in the area of the side where the support bearing 9 is located (namely, on the side of the tubular duct 2 where the through opening 7 is located).

Figure 6:
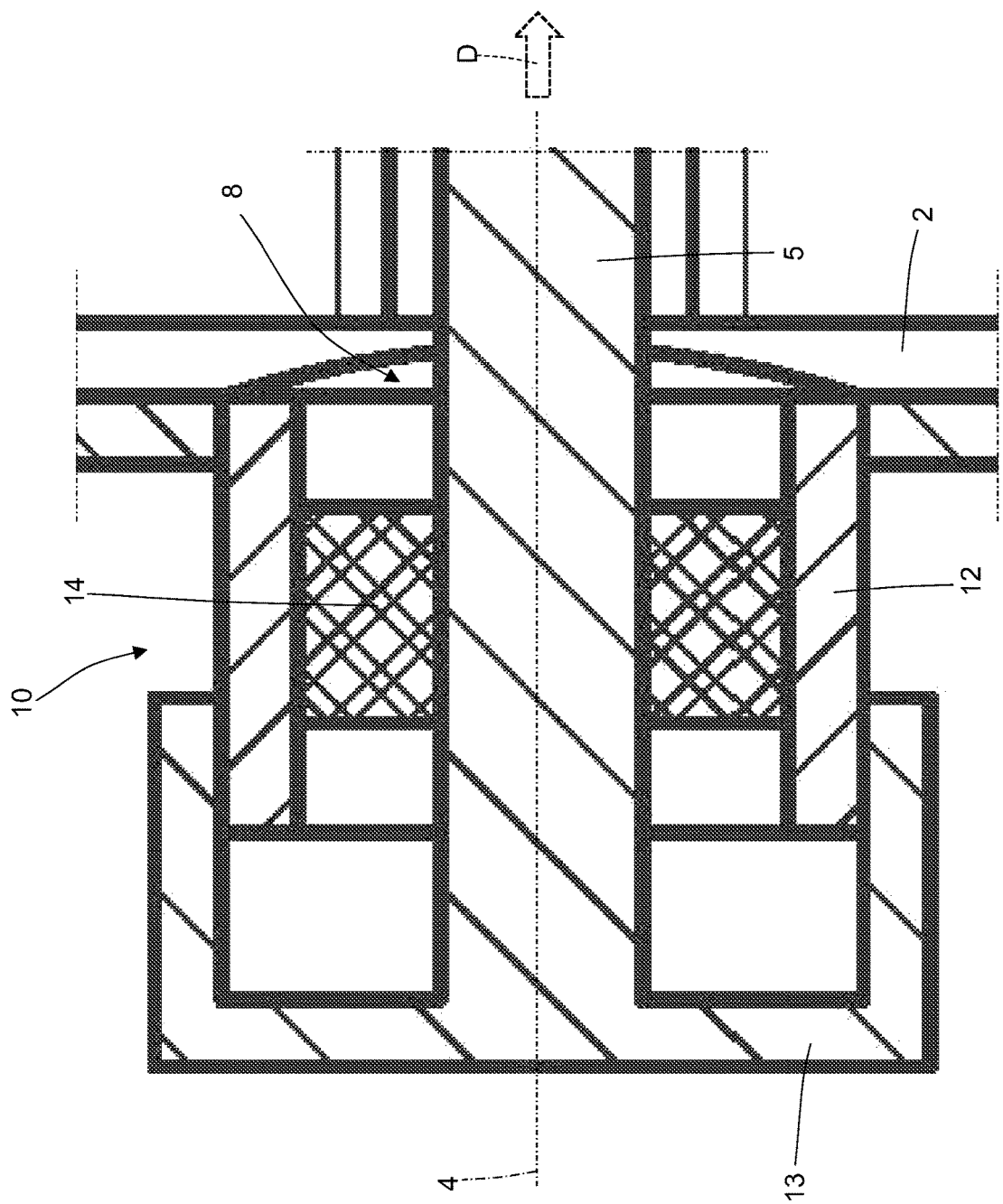
FIGS. 6 and 7 are two views, on a larger scale, of respective details of FIG. 5.

According to FIG. 6, the support bearing 10 comprises a tubular support body 12 with a cylindrical shape, which is coaxial to the rotation axis 4, is integral (typically, welded) to the tubular duct 2 and projects from the tubular duct 2 around the through opening 8; furthermore, the support bearing 10 comprises a cup-shaped body 13, which is integral (typically, welded) to an end of the shaft 5 and contains, on the inside, an end of the support body 12. Namely, the cup-shaped body 13 embraces, with a small clearance, an outer surface of the support body 12 so as to seal the inner cavity of the support body 12.

Furthermore, the support bearing 10 comprises a cylindrical sealing element 14, which is inserted in the tubular support body 12 and has, at the centre, a through hole where the shaft 5 is arranged; preferably, the sealing element 14 is made of a refractory (hence, thermally insulating) material, preferably a ceramic material and preferably loaded with graphite or with other similar materials in order to have a small friction. The central hole of the sealing element 14 houses, with a small clearance, an outer surface of the shaft 5 so as to seal the inner cavity of the support body 12; similarly, the inner cavity of the support body 12 houses, with a small clearance, the sealing element 14 so as to seal the inner cavity of the support body 12. The sealing element 14 can be driven with force into the tubular support body 12 (so that the sealing element 14 remains still inside the tubular support body 12 and, hence, the shaft 5 slides inside the tubular support body 12) or the sealing element 14 can be driven with force around the shaft 5 (so that the sealing element 14 slides inside the tubular support body 12 together with the shaft 5).

The exhaust gases present along the exhaust duct 2, in order to be able to flow out (leak) through the through opening 8 (engaged by the support bearing 10), at first, must flow through the narrow annular passage between the shaft 5 and the sealing element 14 or through the narrow annular passage between the sealing element 14 and the support body 12 and, subsequently, must flow through the narrow annular passage between the support body 12 and the cup-shaped body 13. In this way, the support bearing 10 effectively allows the tubular duct 2 to be insulated from the outside, allowing, at the same time, the shaft 5 both to rotate with a small friction around the rotation axis 4 and to axially slide with a small friction along the rotation axis 4.

Figure 7:
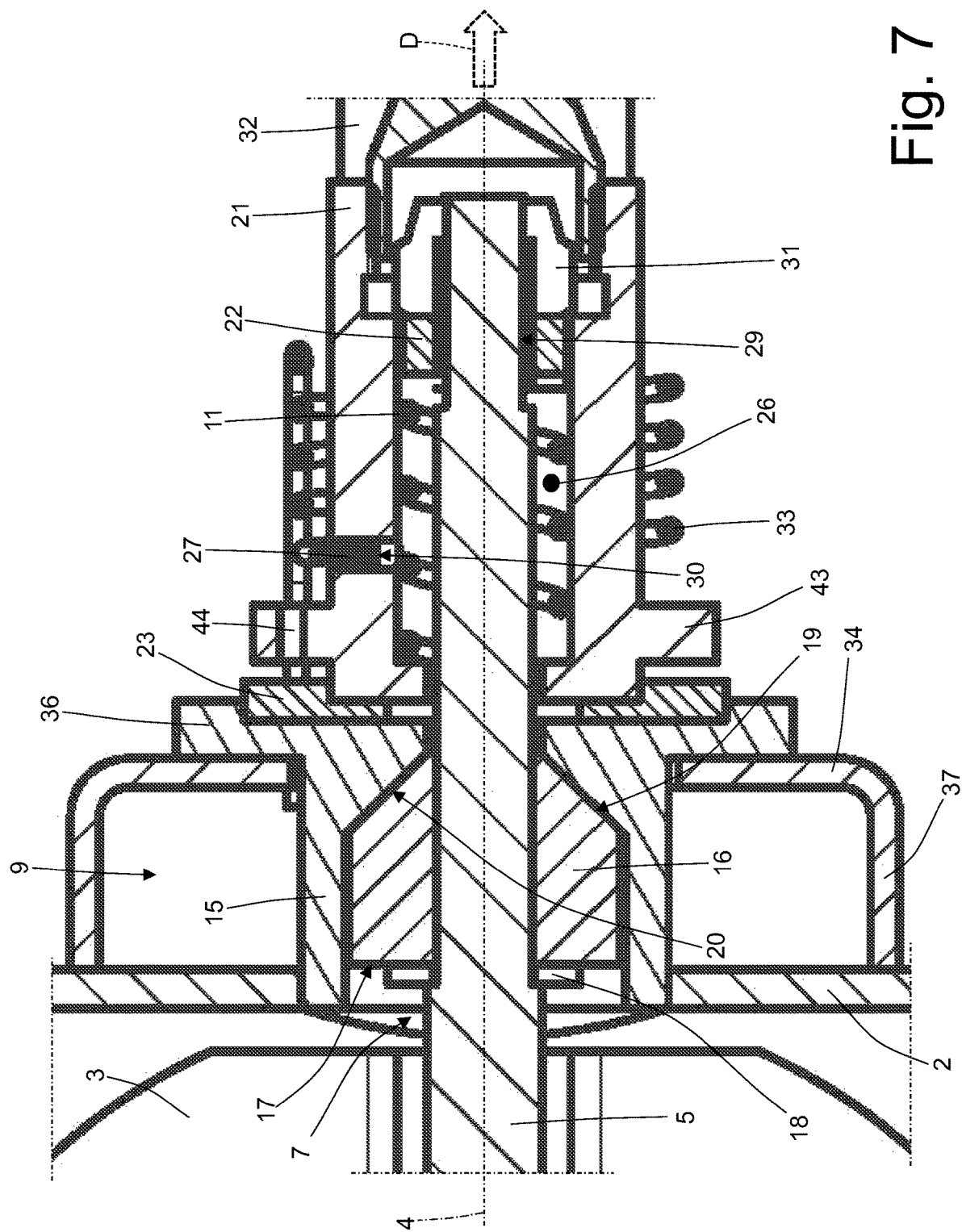

According to FIG. 7, the support bearing 9 comprises a tubular support body 15 with a cylindrical shape, which is coaxial to the rotation axis 4, is integral (typically, welded) to the tubular duct 2 and projects from the tubular duct 2 around the through opening 7; the support body 15 is centrally perforated in order to house the shaft 5, which goes through the support body 15 from side to side. The support bearing 9 further comprises a sealing element 16 (at least partially) with the shape of a truncated cone, which is arranged around the shaft 5 and has a wall 17, which rests against a flange 18 axially integral to the shaft 5, and a wall 19, which is opposite the wall 17 and has the shape of a truncated cone. The support body 15 has, on the inside, a cavity, which houses the sealing element 16 and has a wall 20 with the shape of a truncated cone, against which the wall 19 of the sealing element 16 rests. In particular, the axial thrust exerted by the spring 11 along the pushing direction D holds the truncated cone wall 19 of the sealing element 16 pressed, with a given force, against the truncated cone wall 20 obtained inside the support body 15.

The sealing element 16 has, at the centre, a through hole where the shaft 5 is arranged with a basically zero clearance (since, in use, the shaft 5 does not have to axially slide relative to the sealing element 16). For example, the sealing element 16 can be driven with a given force along the shaft 5 until is strikes against the flange 18. According to a preferred embodiment, the sealing element 16 is made of a refractory (hence, thermally insulating) material, preferably a ceramic material. According to a preferred embodiment shown in the accompanying figures, the flange 18 consists of a bushing, which is fitted around the shaft 5 (if necessary, driven with a given force along the shaft 5) and rests against an abutment of the shaft 5.

The exhaust gases present along the exhaust duct 2, in order to be able to flow out (leak) through the through opening 7 (engaged by the support bearing 9), must flow through the narrow annular passage between the sealing element 16 an the support body 15; however, said annular passage is particularly narrow and particularly extended thanks to the force coupling between the truncated cone wall 19 of the sealing element 16 and the truncated cone wall 20 obtained inside the support body 15 (indeed, the spring 11 pushes the truncated cone wall 19 with a given force against the truncated cone wall 20, thus reducing the size of the annular passage). In this way, the support bearing 9 effectively allows the tubular duct 2 to be insulated from the outside, allowing the shaft 5 both to rotate with a small friction around the rotation axis 4 and to axially slide with a small friction along the rotation axis 4.

According to FIG. 7, the throttle valve 1 comprises a cup-shaped containing element 21 with a cylindrical shape, which is perforated at the centre in order to house the shaft 5; the containing element 21 rests against the support body 15 so as to rotate, relative to the support body 15, around the rotation axis 4 and contains, on the inside, the spring 11 compressed between a bottom wall of the containing element 21 and a flange 22, which is rotationally and axially integral to the shaft 5. The containing element 21 is preferably made of a metal material having, as much as possible, a low heat transmission coefficient.

According to a preferred embodiment shown in the accompanying figures, an insulating disc 23 is provided, which is made of a refractory (hence, thermally insulating) material, preferably a ceramic material, and is interposed between the support body 15 and the containing element 21. The insulating disc 23 is perforated at the centre in order to house the shaft 5, which goes through the insulating disc 23 from side to side. Furthermore, the support body 15 has a circular seat 24 (better shown in FIG. 2), which accommodates, on the inside, a portion of the insulating disc 23 in order to provide a radial containment for the insulating disc 23 (namely, in order to prevent the insulating disc 23 from making undesired radial movements relative to the rotation axis 4). Similarly, the insulating disc 23 has a circular seat 25 (better shown on FIG. 2), which accommodates, on the inside, a portion of the containing element 21 in order to provide a radial containment for the containing element 21 (namely, in order to prevent the containing element 21 from making undesired radial movements relative to the rotation axis 4).

The containing element 21 has, on the inside, a cylindrical chamber 26 where the spring 11 is arranged. Furthermore, the electric actuator 6 directly causes the rotation of the containing element 21 around the rotation axis 4. An end 27 (better shown in FIG. 2) of the spring 11 is integral to the containing element 21 and an end 28 of the spring 11 opposite the end 27 is rotationally integral to the shaft 5, so that a rotary motion around the rotation axis 4 is transmitted from the containing element 21 to the shaft 5 through the first spring 11. In the chamber 26, the spring 11 is compressed between a bottom wall of the containing element 21 (on the opposite side relative to the insulating disc 23) and the flange 22 rotationally and axially integral to the shaft 5. According to a preferred embodiment, the flange 22 consists of a bushing, which is fitted around the shaft 5 and has a central hole 29, which is asymmetrical relative to the rotation axis 4 so as to make the bushing rotationally integral to the shaft 5 (obviously, the shaft 5 also locally has a shape that reproduces the asymmetrical shape of the central hole 29 of the bushing in order to be coupled to the bushing without clearance).

The end 27 of the spring 11 is preferably inserted into a hole 30 (better shown in FIG. 2), which is radially oriented relative to the rotation axis 4 and is made through a side wall of the containing element 21; on the other hand, the end 28 of the spring 11 is inserted into a hole (not shown), which is radially oriented relative to the rotation axis 4 and is made through a base wall of the flange 22 (namely, the end 28 of the spring 11 is fixed to the flange 22).

According to a preferred embodiment, the throttle valve 1 comprises a self-locking nut 31, which is screwed onto an end of the shaft 5 (which, therefore, is threaded) until it strikes against the flange 22; hence, the self-locking nut 31 provides an axial containment for the flange 22, ensuring the stability of the axial position of the flange 22 along the shaft 5.

The throttle valve 1 comprises a connector 32, which, at one end, is screwed to the containing element 21 (hence, is rotationally and axially integral to the containing element 21) and, at the opposite end, is coupled to the electric actuator 6 by means of a spline coupling. In particular, the containing element 21 is screwed to the connector 32 on the opposite side relative to the support body 15. The connector 32 has the function of transmitting the rotation movement from the electric actuator 6 to the containing element 21, anyway allowing the connector 32 to axially slide relative to the electric actuator 6. The connector 32 is preferably made of a metal material having, as much as possible, a low heat transmission coefficient.

As mentioned above, the end 27 of the spring 11 is rigidly fixed to the containing element 21 (hence, the end 27 of the spring 11 is forced to rotate in an integral manner together with the containing element 21), whereas the end 28 of the spring 11 opposite the end 27 is rigidly fixed to the flange 22 rotationally integral to the shaft 5 (hence, the end 28 of the spring 11 is forced to rotate in an integral manner together with the shaft 5); in this way, the rotation movement generated by the electric actuator 6: is transmitted from the electric actuator 6 to the connector 32 through the spline coupling, is transmitted from the connector 32 to the containing element 21 through the screw coupling (the connector 32 is screwed to the containing element 21), is transmitted from the containing element 21 to the spring 11 through the locking of the end 27 of the spring 11 in the containing element 21 and, finally, is transmitted from the spring 11 to the shaft 5 through the locking of the end 28 of the spring 11 to the flange 22 rotationally integral to the shaft 5. It should be pointed out that the spring 11 (inevitably) has a given torsion elasticity; therefore, the transmission of the rotation movement to the shaft 5 through the spring 11 takes place with a given yielding and, hence, with a given shock absorption.

According to a preferred embodiment shown in FIGS. 1-7, the throttle valve 1 comprises a spring 33, which is arranged around the containing element 21, at an end is (indirectly) integral to the tubular duct 2, at an opposite end is integral to the containing element 21 and (indirectly) applies a twisting torque to the shaft 5, which pushes the throttle shutter 3 towards a completely open position (according to a variant, towards a completely closed position). Thanks to the presence of the spring 33, the throttle valve 1 can normally be open (closed) and, hence, in case of absence of intervention of the electric actuator 6 (and, therefore, also in case of fault of the electric actuator 6), it places itself in a completely open (closed) position, which constitutes a safe configuration (namely, a configuration that does not jeopardize the integrity of the system in which the throttle valve 1 is inserted).

Figure 2:
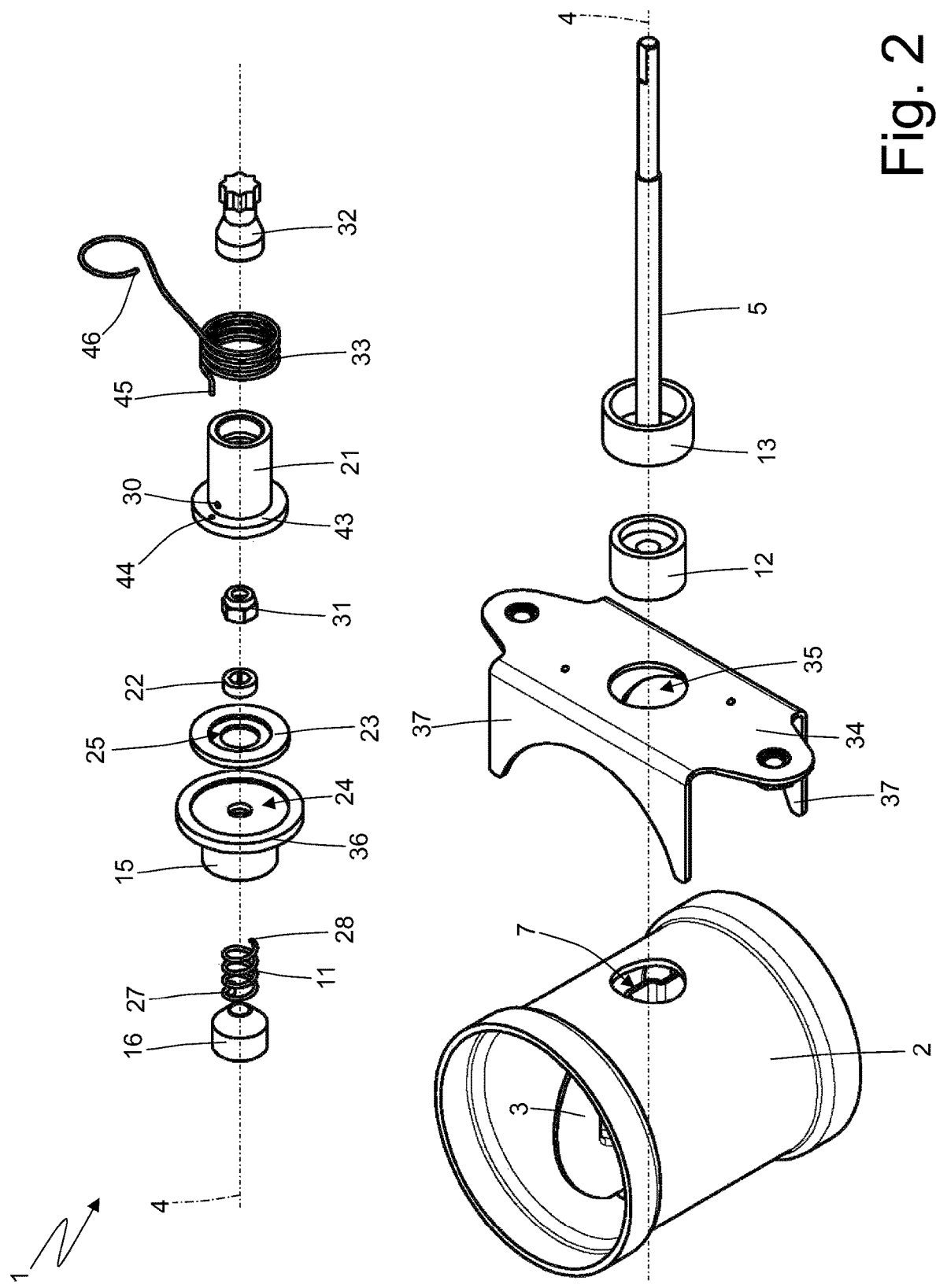
FIG. 2 is an exploded perspective view of part of the throttle valve of FIG. 1.
Figure 3:
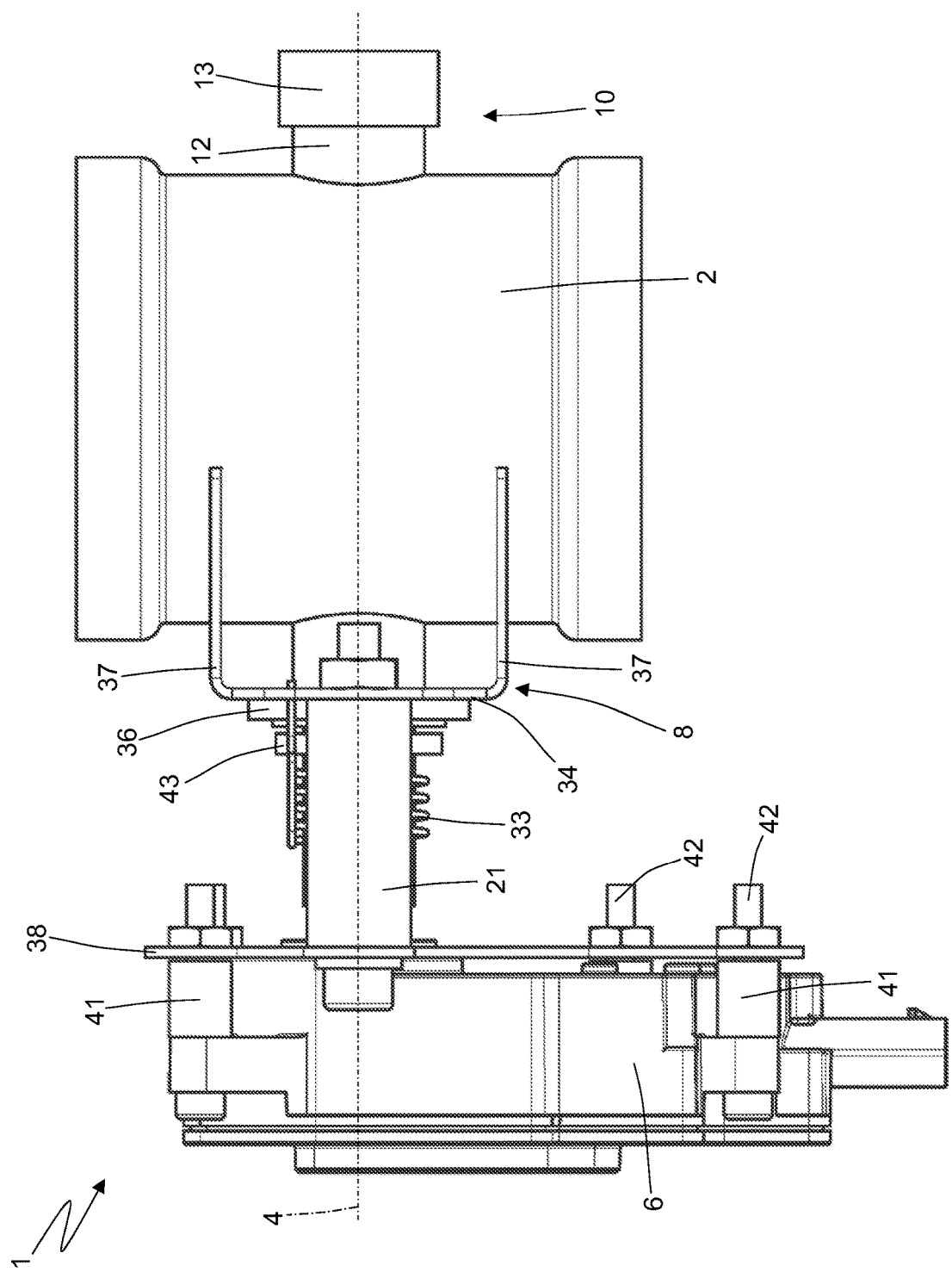
FIG. 3 is a side view of the throttle valve of FIG. 1.

According to FIGS. 1 and 2, the throttle valve 1 comprises a mounting plate 34 (preferably, a metal plate), which is oriented perpendicularly to the rotation axis 4, is fixed (preferably, welded) to the tubular body 2 and has a through opening 35, which is coaxial to the rotation axis 4 and is engaged by the support body 15; namely, the support body 15 goes through (substantially with no clearance) the through opening 35 of the mounting plate 34. According to a preferred embodiment, the support body 15 has, at an end, a circular collar 36, which rests against an outer surface of the mounting plate 34 opposite the tubular duct 2. The mounting plate 34 preferably has two brackets 37, which are oriented perpendicularly to the mounting plate 34, are arranged at opposite ends of the mounting plate 34 and are welded to an outer surface of the tubular duct 2.

To sum up, the support body 12 is simply mounted on the tubular body 2 in a projecting manner (namely, it is fixed, preferably welded by means of an annular weld, to the tubular body 2 only at one end), whereas the tubular body 15 is directly fixed (preferably, welded by means of an annular weld) to the tubular body 2 at an end, whereas, at the opposite end, it is connected to the mounting plate 34, which, in turn, is fixed to the tubular body 2 by means of the pair of brackets 37 arranged perpendicularly to the mounting plate 34.

According to FIGS. 1 and 3-5, the throttle valve 1 comprises a mounting plate 38 (preferably, a metal plate), which is parallel to the mounting plate 34, is spaced apart from the mounting plate 34, is fixed to the mounting plate 34 and directly supports the electric actuator 6.

In particular, tubular distancing columns 39 are provided, which are oriented parallel to the rotation axis 4, are interposed between the two mounting plates 34 and 38 and are internally crossed by respective screws 40, which pull the two mounting plates 34 and 38 towards one another. Furthermore, tubular distancing columns 41 are provided, which are oriented parallel to the rotation axis 4, are interposed between mounting brackets of the electric actuator 6 and the mounting plate 38 and are internally crossed by respective screws 42, which pull the electric actuator 6 towards the mounting plate 38.

According to FIG. 2, the containing element 21 has an annular collar 43, which is arranged close to the support body 15 (namely, on the opposite side relative to the connector 32) and where an axially oriented hole 44 (namely, oriented parallel to the rotation axis 4) is obtained, in which an end 45 of the spring 33 is inserted; the other end 46 of the spring 33 opposite the end 45 is preferably arranged around a distancing column 39 (as shown in FIG. 1), which is integral to the support duct 2.

According to a preferred embodiment, the throttle shutter 3 is shaped in an asymmetric manner so as to have, on the side of the support bearing 9, a first clearance relative to an inner surface of the tubular duct 2 (namely, a first distance from the inner surface of the tubular duct 2) and so as to have, on the opposite side relative to the support bearing 9 (namely, on the side of the support bearing 10), a second clearance relative to the inner surface of the tubular duct 2 (namely, a second distance from the inner surface of the tubular duct 2), which is greater than the first clearance. Indeed, the thermal expansion of the shaft 5 causes the edge of the throttle shutter 3 to get closer to the inner surface of the tubular body 2 in proximity to the support bearing 10 due to the axial thrust generated by the spring 11, which always keeps the shaft 5 (hence, the throttle shutter 3 mounted on the shaft 5) pushed in a predetermined position in the area of the support bearing 9. In other words, the axial thrust generated by the spring 11 keeps, on the side of the support bearing 9, the shutter 3 in a fixed and predetermined position and, therefore, the thermal expansions of the shaft 5 move the throttle shutter 3 closer to (when the shaft 5 heats up) or away from (when the shaft 5 cools down) the inner surface of the tubular duct 2 in the area of the support bearing 10.

Figure 8:
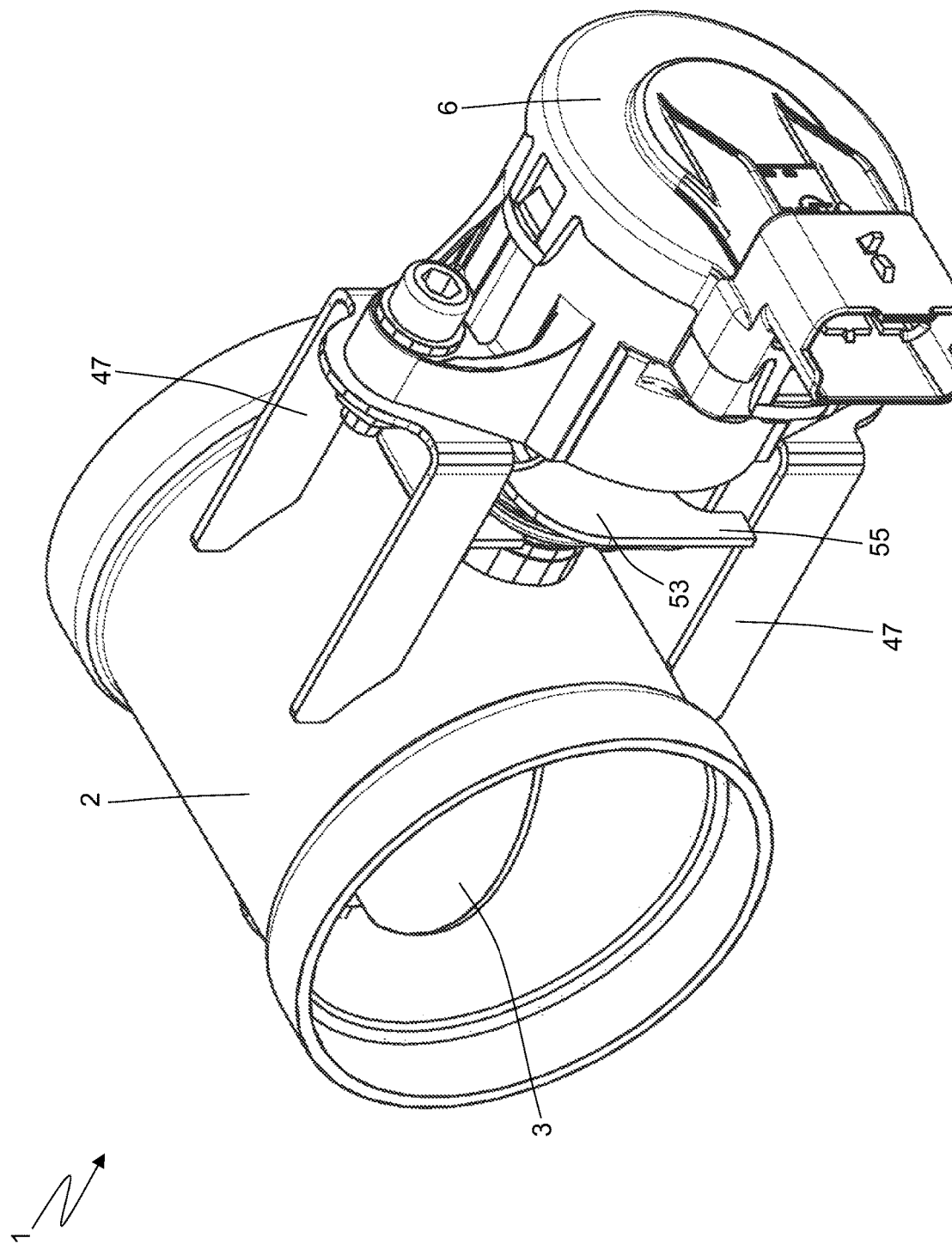
FIGS. 8 and 9 are two different perspective views of a different embodiment of the throttle valve of FIG. 1.
Figure 9:
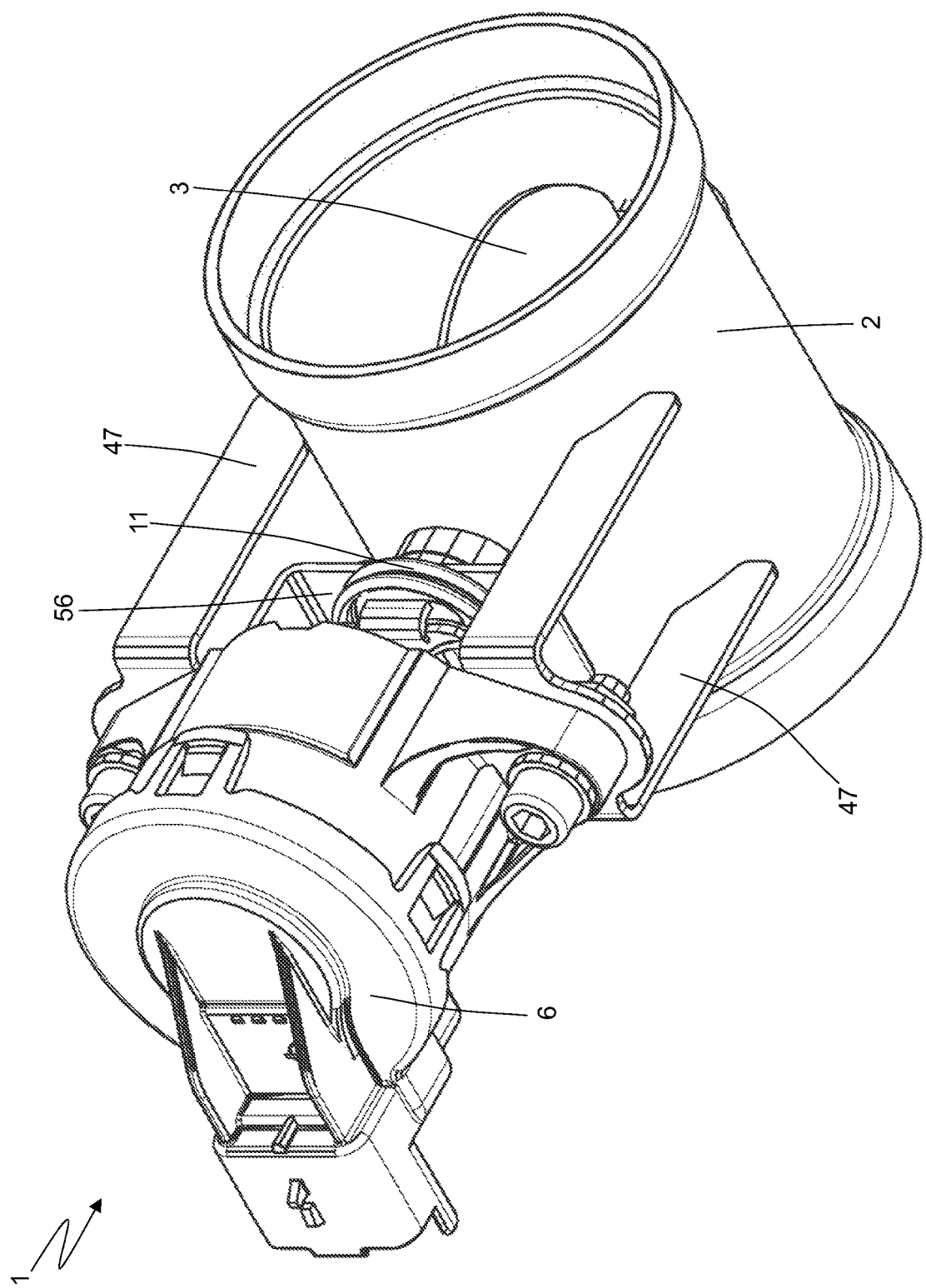
Figure 10:
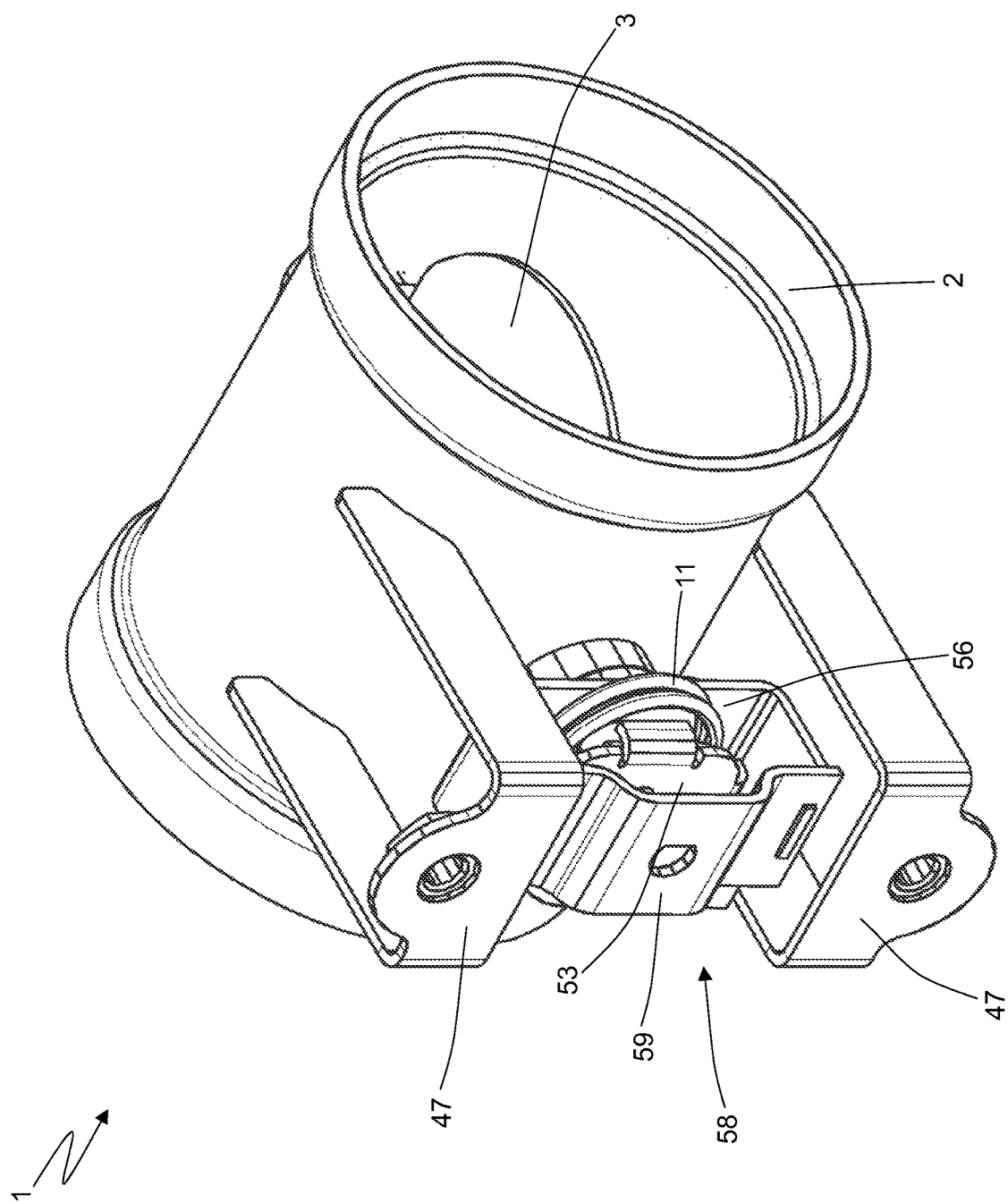
FIG. 10 is a perspective view of the throttle valve of FIGS. 8 and 9 with the removal of an electric actuator.

FIGS. 8 and 9 show a different embodiment of the throttle valve 1, wherein the electric actuator 6 has a different outer conformation and is connected to the tubular duct 2 by means of two support elements 47, which are "U"-shaped, are made of a pressed and bent sheet metal and are welded to an outer wall of the tubular duct 2. In particular, the electric actuator 6 rests against a wall of each support element 47, to which it is firmly connected by means of a corresponding screw, which engages a through hole (shown in FIG. 10) made in the wall of the support element 47.

According to FIG. 15, the support bearing 10 is shaped differently since it comprises a tubular housing 48, which projects from the tubular duct 2 in the area of the support bearing 10 and contains, on the inside, an annular support body 49 (with a cylindrical shape), which is coaxial to the rotation axis 4 and inside which a terminal end of the shaft 5 is arranged. The support body 49 is integral to the tubular housing 48 (hence, to the tubular duct 2) and the terminal end of the shaft 5 rotates and axially slides inside the support body 49 and relative to the support body 49 or the support body 49 is integral to the shaft 5 and rotates and axially slides inside the tubular housing 48 together with the shaft 5. The body 49 is preferably made of a refractory (hence, thermally insulating) material, preferably a ceramic material and preferably loaded with graphite or other similar materials in order to have a low friction. A lid 50 is provided, which is fixed to the tubular housing 48 from the outside and seals the tubular housing 48. According to a preferred embodiment, the terminal end of the shaft 5 is coupled to the support body 49 so as to have a given axial clearance, namely, so that it can axially slide in both directions inside the annular support body 49.

Figure 14:
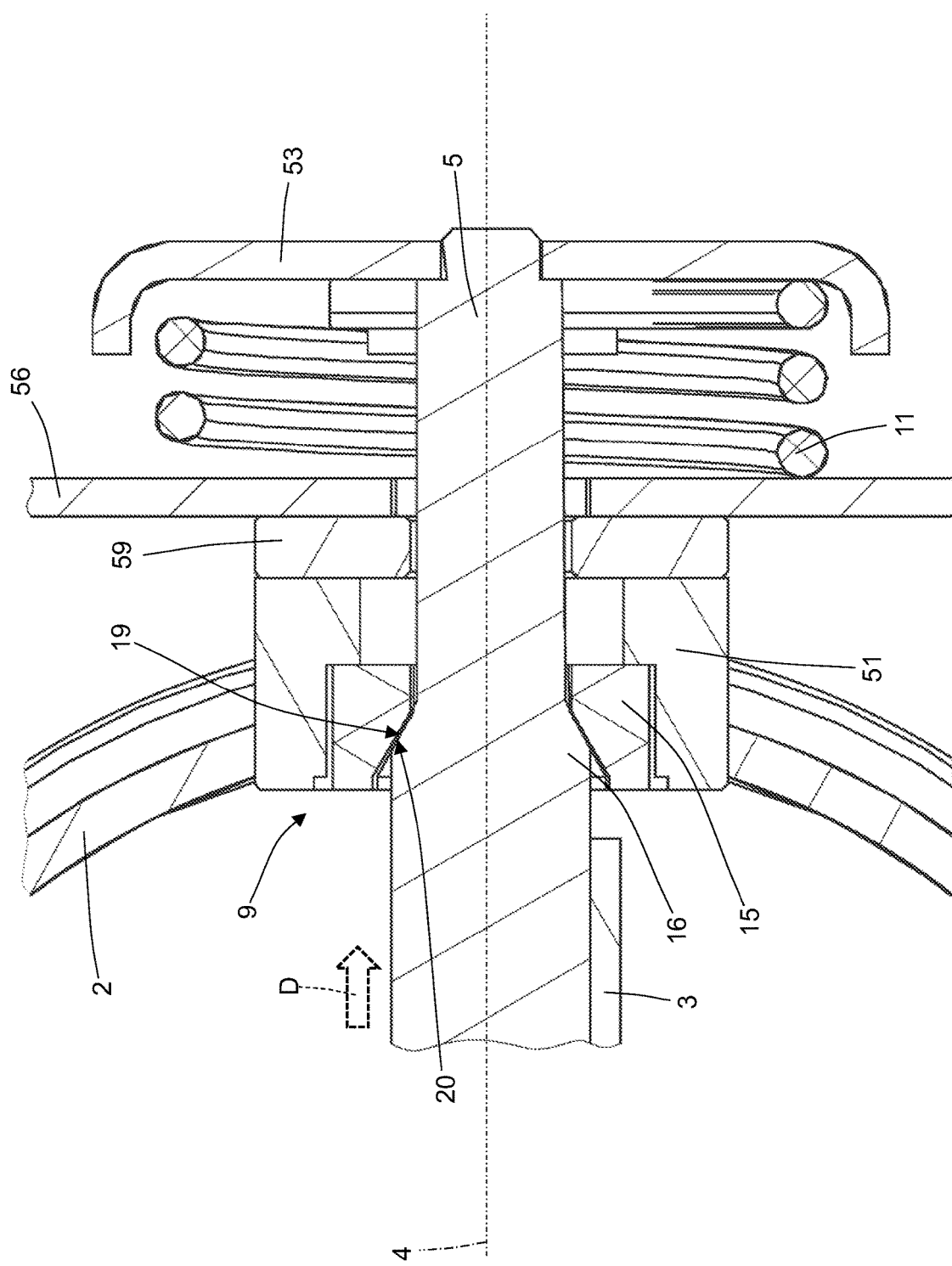

According to FIG. 14, the support bearing 9 is shaped differently since it comprises a tubular housing 51, which projects from the tubular duct 2 in the area of the support bearing 9 and contains, on the inside, the annular support body 15 (with a cylindrical shape and shaped differently compared to the embodiment shown in FIGS. 1-7), which is coaxial to the rotation axis 4 and inside which an intermediate (namely, non-terminal) end of the shaft 5 is arranged. Hence, the support body 15 is perforated at the centre in order to house the shaft 5, which goes through the support body 15 from side to side. In other words, the support body 15 is integral to the tubular housing 51 (hence, to the tubular duct 2) and the intermediate end of the shaft 5 rotates inside the support body 15 and relative to the support body 15. The body 15 is preferably made of a refractory (hence, thermally insulating) material, preferably a ceramic material and preferably loaded with graphite or other similar materials in order to have a low friction.

According to a preferred embodiment, the tubular housing 51 has an abutment, against which the support body 15 rests in order to axially contain the support body 15; namely, the abutment of the tubular housing 51 prevents the support body 15 from getting out of the tubular duct 2 because of the thrust of the spring 11.

In the embodiment shown in FIGS. 8-15, the sealing element 16 (at least partially) having the shape of a truncated cone, which is arranged around the shaft 5, is no longer independent of the shaft 5 and, hence mounted on the shaft 5, but is integrated in the shaft 5, since it is an integral part, without interruptions, of the shaft 5; in other words, the sealing element 16 is obtained in the shaft 5 (instead of being added to the shaft 5) by means of a reduction in the diameter of the shaft 5 (i.e. it consists of a reduction in the diameter of the shaft 5). The wall 19 of the sealing element 16 has the shape of a truncated cone and rests (pushed by the spring 11) against the corresponding wall 20 with the shape of a truncated cone obtained inside the support body 15.

As mentioned above, the spring 11 applies to the shaft 5 and elastic force, which is axially oriented and pushes the shaft 5 along the pushing direction D oriented so as to press the sealing element 16 against the support body 15. Furthermore, as mentioned above, the spring 11 is interposed between a shaft 52 (shown in FIG. 11) of the electric actuator 6 and the shaft 5 supporting the throttle shutter 3 so as to transmit a rotary motion around the rotation axis 4 from the shaft 52 of the electric actuator 6 to the shaft 5 supporting the throttle shutter 3. Namely, the shaft 52 of the electric shutter 6 is not rigidly constrained to the shaft 5 supporting the throttle shutter 3 so as to directly transmit the rotary motion to the shaft 5, but the shaft 52 of the electric actuator 6 applies a rotary torque to the end 27 of the spring 11 (which is integral to the shaft 52) and, then, the spring 11 transmits the rotary torque to its own end 28 (which is integral to the shaft 5). Namely, the end 28 of the spring 11 is rotationally integral to the shaft 5 and the end 27 of the spring 11 opposite the end 28 is rotationally integral to the shaft 52 of the electric actuator 6 so that the spring 11 can transmit the rotary torque (namely, the rotation movement around the rotation axis 4) from the shaft 6 to the shaft 5.

Figure 11:
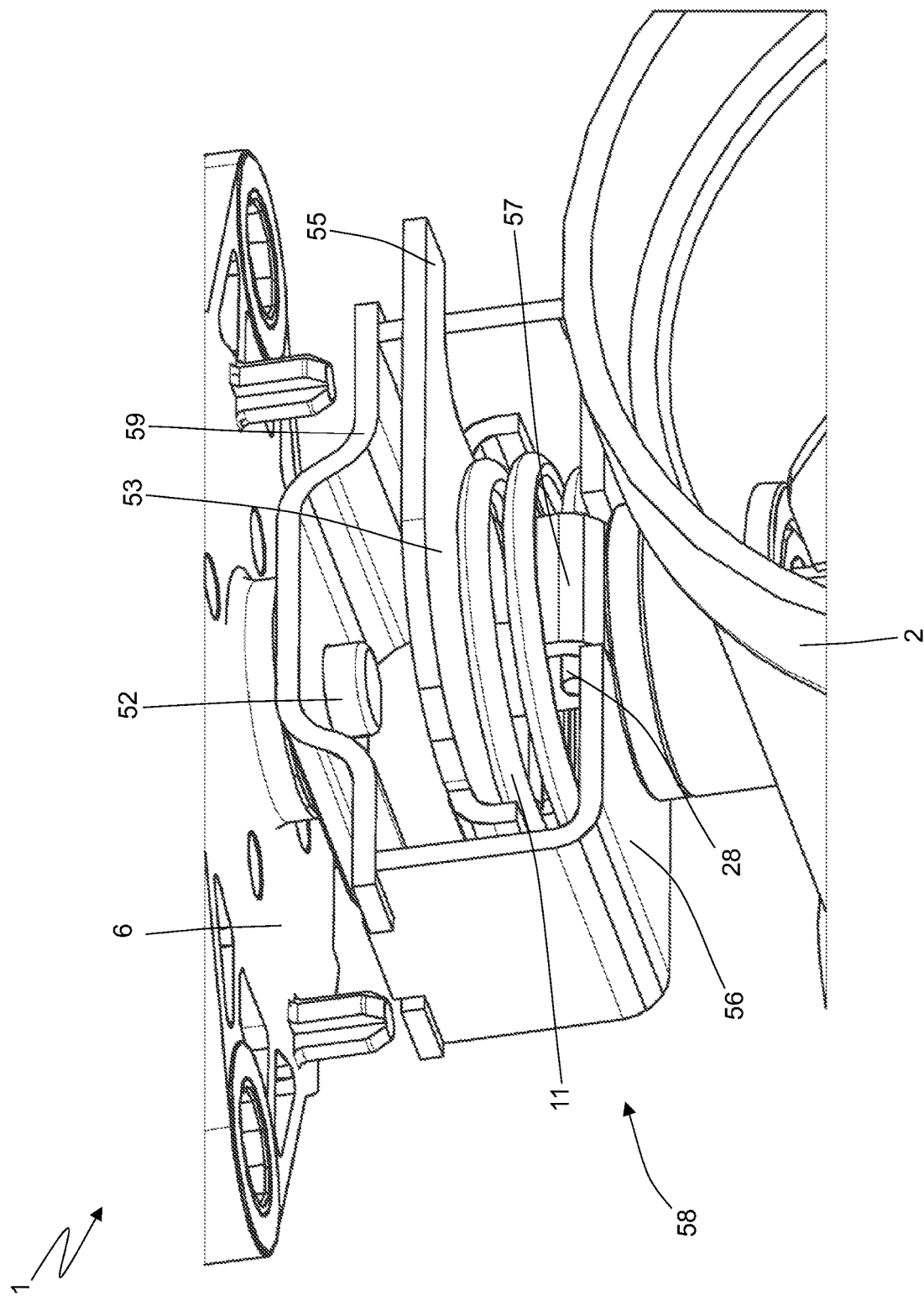
FIGS. 11 and 12 are two perspective views, on a larger scale, of a detail of the throttle valve of FIGS. 8 and 9.
Figure 12:
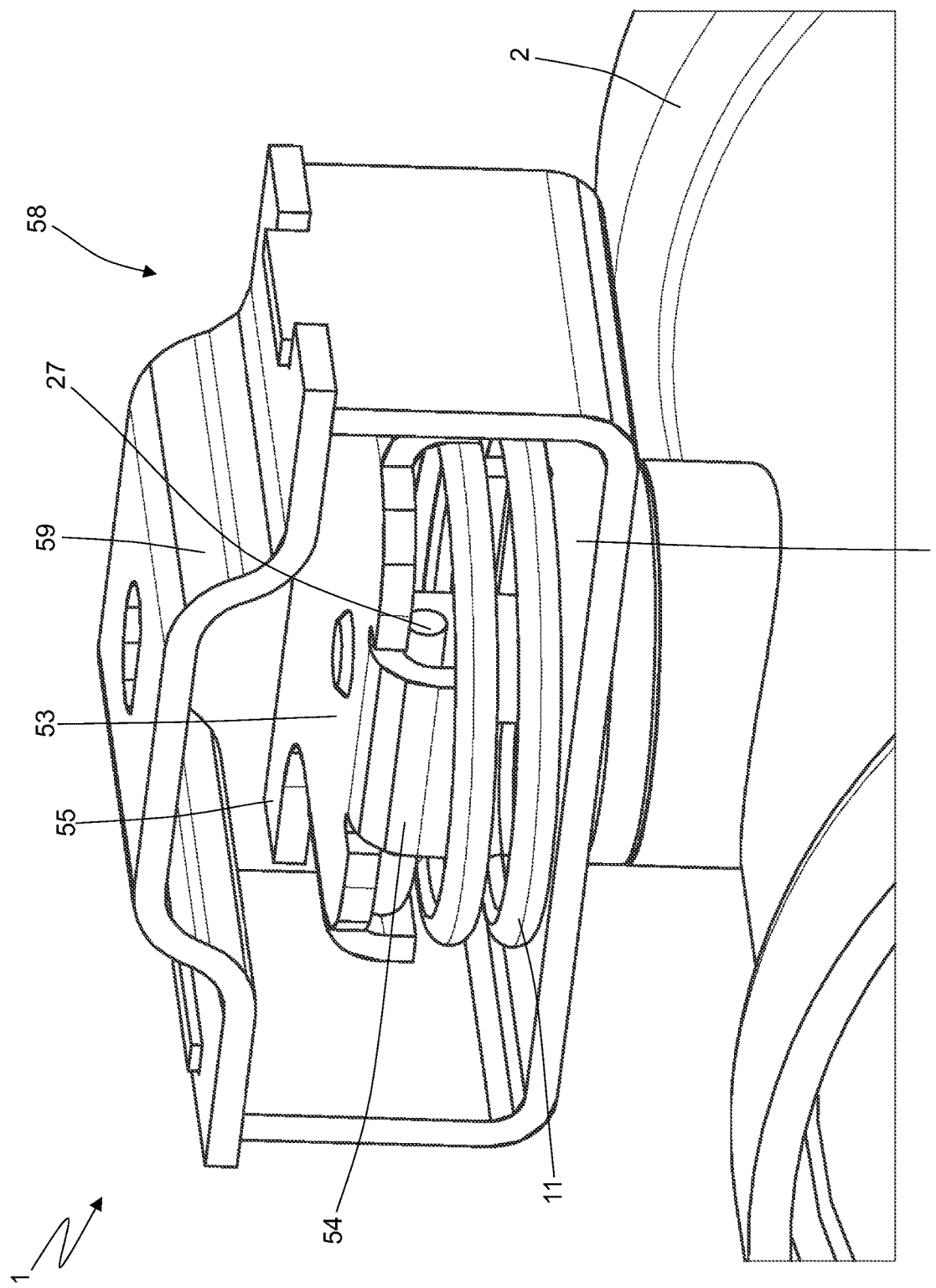
Figure 13:
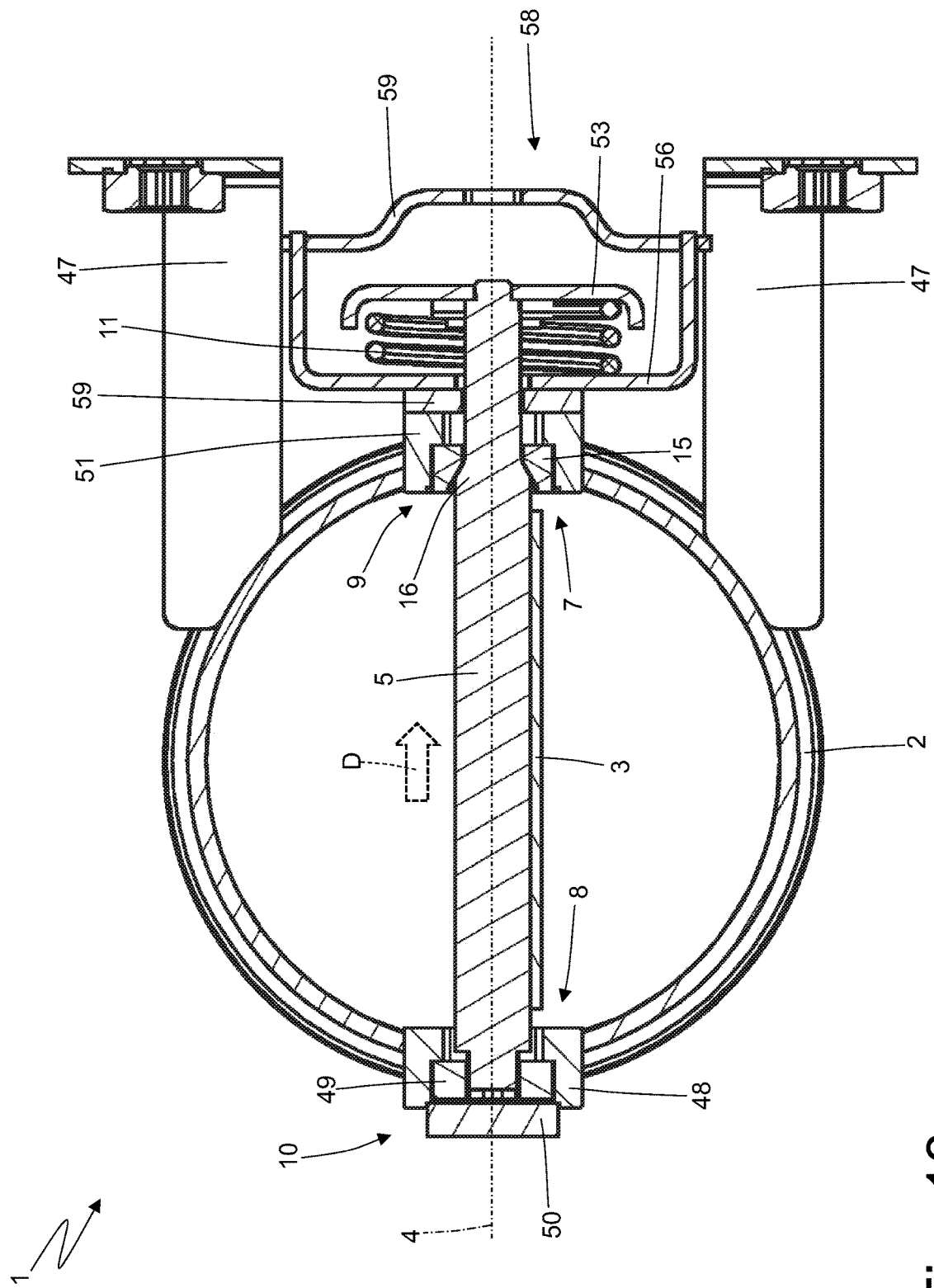
FIG. 13 is a cross-section view of the throttle valve of FIGS. 8 and 9.

According to FIGS. 11 and 12, a plate 53 is provided, which is integral to the shaft 5, is arranged on the outside of the tubular duct 2 more externally than the support bearing 9 and constitutes a striker against which the spring 11 is compressed; in particular, a terminal end of the shaft 5 is driven, through interference, into a central through hole of the plate 53 and, if necessary, the terminal end of the shaft 5 is also welded to the plate 53. Furthermore, the plate 53 is caused to be rotationally integral to the end 28 of the spring 11 by means of an appendage 54, which protrudes from the plate 53 and embraces the end 28 of the spring 11.

According to a preferred embodiment, the plate 53 has a tail 55, which, when the throttle shutter 3 is in the maximum opening position, rests against one of the support elements 47 (as shown in FIG. 8); in this way, the tail 55 of the plate 53 defines, in a precise and certain manner (namely, through a mechanical limit stop), the maximum opening position of the throttle shutter 3. In other words, the tail 55 of the plate 53 constitutes a mechanical limit stop, which establishes, in a precise and certain manner, the maximum opening position of the throttle shutter 3.

According to FIGS. 11 and 12, a plate 56 is provided, which is integral to the shaft 52 of the electric actuator 6, is arranged on the outside of the tubular duct 2 more externally than the support bearing 9, is arranged between the support bearing 9 and the plate 53, is crossed without contact by the shaft 5 and constitutes a striker against which the spring 11 is compressed. In other words, the spring 11 is internally compressed against the plate 56 and is externally compressed against the plate 53; namely, the two plates 53 and 56 define a space, which accommodates the spring 11, which is axially compressed. Furthermore, the plate 56 is caused to be rotationally integral to the end 27 of the spring 11 by means of an appendage 57, which protrudes from the plate 56 and embraces the end 27 of the spring 11. The plate 56 is crossed without contact by the shaft 5 and, in particular, the plate 56 has a through hole, inside which the shaft 5 is arranged and which has a diameter that is properly larger than the diameter of the shaft 5, in order to avoid touching the shaft 5.

According to a preferred embodiment, the plate 56 is part of a tubular connection structure 58 (namely, an internally hollow structure), which contains, on the inside, the plate 53 and the spring 11 and has a plate 59, which is rigidly fixed to the plate 56 and is rotationally integral to the shaft 52 of the electric actuator 6. Namely, the plate 53 is arranged between the plate 56 and the plate 59. In particular, the plate 56 has two side walls, which are arranged at the two opposite ends of the plate 56 and end in the plate 59. According to a preferred embodiment shown in FIG. 14, between the tubular housing 51 of the support bearing 9 and the plate 56 there is interposed a thermally insulating disc 60, which is made of a refractory (hence, thermally insulating) material, preferably a ceramic material, and is crossed by the shaft 5 from side to side.

According to a preferred embodiment, between the plate 59 and the electric actuator 6 there is interposed a thermally insulating disc, which is made of a refractory (hence, thermally insulating) material, preferably a ceramic material, and is crossed by the shaft 52 of the electric actuator 6 from side to side.

Owing to the above, the spring 11 clearly fulfils two functions: applying an axial thrust along the pushing direction D to the shaft 5 and, at the same time, transmitting a rotary motion around the rotation axis 4 from the shaft 52 of the electric actuator 6 to the shaft 5 supporting the throttle shutter 3.

The embodiments described herein can be combined with one another, without for this reason going beyond the scope of protection of the invention.

The throttle valve 1 described above has numerous advantages.

First of all, the throttle valve 1 described above preserves the integrity of the electric actuator 6, for it minimizes the transfer of heat from the exhaust gases flowing along the tubular duct 2 to the electric actuator 6.

Furthermore, the throttle valve 1 described above minimizes exhaust gas leaks towards the outside through the two support bearings 9 and 10 (also taking into account inevitable thermal expansions of the support shaft 5).

Finally, the throttle valve 1 described above is simple and economic to be manufactured, since it consists of (relatively) few parts with a non-complicated shape and easy to be assembled together.

LIST OF THE REFERENCE NUMBERS OF THE FIGS 1 throttle valve
2 tubular duct
3 throttle shutter
4 rotation axis
5 shaft
6 electric actuator
7 through opening
8 through opening
9 support bearing
10 support bearing
11 spring
12 support body
13 cup-shaped body
14 sealing element
15 support body
16 sealing element
17 wall
18 flange
19 wall
20 wall
21 containing element
22 flange
23 insulating disc
24 seat
25 seat
26 chamber
27 end
28 end
29 hole
30 hole
31 self-locking nut
32 connector
33 spring
34 mounting plate
35 through opening
36 collar
37 brackets
38 mounting plate
39 distancing column
40 screws
41 distancing column
42 screws
43 collar
44 hole
45 end
46 end
47 support elements
48 tubular housing
49 support body 50 lid
51 tubular housing
52 shaft
53 plate
54 appendage
55 tail
56 plate
57 appendage
58 connection structure
59 plate
60 insulating disc

The invention claimed is:

1. A motor-driven throttle valve (1) for an exhaust duct and comprising:
   a tubular duct (2), which is designed so that exhaust gases can flow through the tubular duct (2);
   a throttle shutter (3), which is arranged inside the tubular duct (2) and is mounted so as to rotate around a rotation axis (4);
   a first shaft (5), which is mounted so as to rotate around the rotation axis (4) and supports the throttle shutter (3);
   an electric actuator (6), which is provided with a second shaft (52) and is designed to rotate the first shaft (5) around the rotation axis (4);
   a first support bearing (9), which supports the first shaft (5) in a through manner and is arranged on a first side of the tubular duct (2);
   a first spring (11), which applies an elastic force to the first shaft (5), said elastic force being oriented in an axial manner and pushing the first shaft (5) along an axially oriented pushing direction (D);
   a first plate (53), which is integral to the first shaft (5), is arranged on the outside of the tubular duct (2) more externally than the first support bearing (9) and constitutes a striker against which the first spring (11) is compressed; and
   a second plate (56), which is integral to the second shaft (52) of the electric actuator (6), is arranged on the outside of the tubular duct (2) more externally than the first support bearing (9), is arranged between the first support bearing (9) and the first plate (53), is crossed without contact by the first shaft (5) and constitutes a striker against which the first spring (11) is compressed;
   wherein the first spring (11) is configured to transmit a rotary motion around the rotation axis (4) from the second shaft (52) of the electric actuator (6) to the first shaft (5) supporting the throttle shutter (3).

2. The throttle valve (1) according to claim 1, wherein a first end (28) of the first spring (11) is rotationally integral to the first shaft (5) and a second end (27) of the first spring (11) opposite the first end (28) is rotationally integral to the second shaft (52) of the electric actuator (6).

3. The throttle valve (1) according to claim 1, wherein the first plate (53) is rotationally integral to a first end (28) of the first spring (11).

4. The throttle valve (1) according to claim 1, wherein the first plate (53) has a tail (55), which constitutes a mechanical limit stop to establish a maximum opening position of the throttle shutter (3).

5. The throttle valve (1) according to claim 1, wherein the second plate (56) is rotationally integral to a second end (27) of the first spring (11).

6. The throttle valve (1) according to claim 1, wherein between the second plate (56) and a first tubular housing (51) of the first support bearing (9) there is interposed a first thermally insulating disc (59), which is crossed by the first shaft (5) from side to side.

7. The throttle valve (1) according to claim 1, wherein the second plate (56) is part of a connection structure (58), which contains, on the inside, the first plate (53) and the first spring (11) and has a third plate (59), which is rigidly fixed to the second plate (56) and is rotationally integral to the second shaft (52) of the electric actuator (6).

8. The throttle valve (1) according to claim 7, wherein between the third plate (59) and the electric actuator (6) there is interposed a first thermally insulating disc, which is crossed by the second shaft (52) of the electric actuator (6) from side to side.

9. The throttle valve (1) according to claim 1, wherein the first support bearing (9) comprises a first sealing element (16) with the shape of a truncated cone that is integrated in the first shaft (5) and consists of a reduction in the diameter of the first shaft (5).

10. The throttle valve (1) according to claim 1, wherein the first support bearing (9) comprises:
    a first sealing element (16) with the shape of a truncated cone having a first wall (17) with the shape of a truncated cone; and
    a first tubular support body (15), which is coaxial to the rotation axis (4), is integral to the tubular duct (2), houses, on the inside, the first shaft (5) and the first sealing element (16) and has, on the inside, a second wall (20) with the shape of a truncated cone, against which the first wall (19) of the first sealing element (16) rests, when it is pushed by the first spring (11).

11. The throttle valve (1) according to claim 10 and comprising a first tubular housing (51), which projects from the tubular duct (2) in the area of the first support bearing (9), contains, on the inside, the first support body (15) and has an abutment, against which the first support body (15) rests in order to axially contain the first support body (15).

12. The throttle valve (1) according to claim 11 and comprising:
    a containing element (21), which rests against the first support body (15) so as to rotate, relative to the first support body (15), around the rotation axis (4) and contains, on the inside, the first spring (11) compressed between a bottom wall of the containing element (21) and a flange (22) rotationally and axially integral to the shaft (5); and
    a second spring (33), which is arranged around the containing element (21), at an end is integral to the tubular duct (2), at an opposite end is integral to the containing element (21) and applies a twisting torque to the shaft (5), which pushes the throttle shutter (3) towards a completely open position or towards a completely closed position.

13. The throttle valve (1) according to claim 10, and comprising a first mounting plate (34), which is fixed to the tubular body (2) and has a through opening (35), which is coaxial to the rotation axis (4) and is engaged by the first support body (15).

14. The throttle valve (1) according to claim 13, wherein the first support body (15) has, at an end, a circular collar (36), which rests against an outer surface of the first mounting plate (34) opposite the tubular duct (2).

15. The throttle valve (1) according to claim 13, wherein the first mounting plate (34) has two brackets (37), which are oriented perpendicularly to the first mounting plate (34), are arranged at opposite ends of the first mounting plate (34) and are welded to an outer surface of the tubular duct (2).

16. The throttle valve (1) according to claim 13 and comprising a second mounting plate (38), which is parallel to the first mounting plate (34), is spaced apart from the first mounting plate (34), is fixed to the first mounting plate (34) and directly supports the electric actuator (6).

17. The throttle valve (1) according to claim 1 and comprising:
- a second support bearing (10), which supports the shaft (5) at an end and is arranged on the outside of the tubular duct (2) and on a second side of the tubular duct (2) opposite the first side of the tubular duct (2); and
- a second tubular housing (48), which projects from the tubular duct (2) in the area of the second support bearing (10) and contains, on the inside, a second support body (49), inside which a terminal end of the first shaft (5) is arranged.

18. A motor-driven throttle valve (1) for an exhaust duct and comprising:
- a tubular duct (2), which is designed so that exhaust gases can flow through the tubular duct (2);
- a throttle shutter (3), which is arranged inside the tubular duct (2) and is mounted so as to rotate around a rotation axis (4);
- a first shaft (5), which is mounted so as to rotate around the rotation axis (4) and supports the throttle shutter (3);
- an electric actuator (6), which is provided with a second shaft (52) and is designed to rotate the first shaft (5) around the rotation axis (4);
- a first support bearing (9), which supports the first shaft (5) in a through manner and is arranged on a first side of the tubular duct (2);
- a first spring (11), which applies an elastic force to the first shaft (5), said elastic force being oriented in an axial manner and pushing the first shaft (5) along an axially oriented pushing direction (D);
- wherein the first spring (11) is configured to transmit a rotary motion around the rotation axis (4) from the second shaft (52) of the electric actuator (6) to the first shaft (5) supporting the throttle shutter (3);
- wherein the first support bearing (9) comprises a first sealing element (16) with the shape of a truncated cone having a first wall (17) with the shape of a truncated cone; and
- wherein the first support bearing (9) comprises a first tubular support body (15), which is coaxial to the rotation axis (4), is integral to the tubular duct (2), houses, on the inside, the first shaft (5) and the first sealing element (16) and has, on the inside, a second wall (20) with the shape of a truncated cone, against which the first wall (19) of the first sealing element (16) rests, when it is pushed by the first spring (11).

19. The throttle valve (1) according to claim 18 and comprising a first tubular housing (51), which projects from the tubular duct (2) in the area of the first support bearing (9), contains, on the inside, the first support body (15) and has an abutment, against which the first support body (15) rests in order to axially contain the first support body (15).

20. The throttle valve (1) according to claim 19 and comprising:
- a containing element (21), which rests against the first support body (15) so as to rotate, relative to the first support body (15), around the rotation axis (4) and contains, on the inside, the first spring (11) compressed between a bottom wall of the containing element (21) and a flange (22) rotationally and axially integral to the shaft (5); and
- a second spring (33), which is arranged around the containing element (21), at an end is integral to the tubular duct (2), at an opposite end is integral to the containing element (21) and applies a twisting torque to the shaft (5), which pushes the throttle shutter (3) towards a completely open position or towards a completely closed position.

21. The throttle valve (1) according to claim 18, and comprising a first mounting plate (34), which is fixed to the tubular body (2) and has a through opening (35), which is coaxial to the rotation axis (4) and is engaged by the first support body (15).

22. The throttle valve (1) according to claim 21, wherein the first support body (15) has, at an end, a circular collar (36), which rests against an outer surface of the first mounting plate (34) opposite the tubular duct (2).

23. The throttle valve (1) according to claim 21, wherein the first mounting plate (34) has two brackets (37), which are oriented perpendicularly to the first mounting plate (34), are arranged at opposite ends of the first mounting plate (34) and are welded to an outer surface of the tubular duct (2).

24. The throttle valve (1) according to claim 21 and comprising a second mounting plate (38), which is parallel to the first mounting plate (34), is spaced apart from the first mounting plate (34), is fixed to the first mounting plate (34) and directly supports the electric actuator (6).

* * * * *